United States Patent
Koyama et al.

(10) Patent No.: US 7,978,762 B2
(45) Date of Patent: Jul. 12, 2011

(54) TRANSCODER DEVICE FOR TRANSCODING COMPRESSED AND ENCODED BITSTREAM OF MOTION PICTURE IN SYNTAX LEVEL AND MOTION PICTURE COMMUNICATION SYSTEM

(75) Inventors: Kazuhiro Koyama, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1575 days.

(21) Appl. No.: 11/335,497

(22) Filed: Jan. 20, 2006

(65) Prior Publication Data

US 2006/0165180 A1    Jul. 27, 2006

(30) Foreign Application Priority Data

Jan. 21, 2005    (JP) ................... 2005-014551

(51) Int. Cl.
*H04B 1/66* (2006.01)
(52) U.S. Cl. .......... 375/240; 704/500; 710/68; 382/276; 382/232
(58) Field of Classification Search ............ 375/240.23, 375/240.01, 240; 704/500; 710/68; 382/276, 382/232
See application file for complete search history.

(56) References Cited

U.S. PATENT DOCUMENTS

| | | | |
|---|---|---|---|
| 2001/0008544 A1* | 7/2001 | Ishiyama | 375/240.12 |
| 2005/0232497 A1* | 10/2005 | Yogeshwar et al. | 382/232 |

FOREIGN PATENT DOCUMENTS

| | | | |
|---|---|---|---|
| JP | 2000-244910 A | 9/2000 |
| JP | 2002-152301 A | 5/2002 |

* cited by examiner

*Primary Examiner* — David C. Payne
*Assistant Examiner* — Zewdu Kassa
(74) *Attorney, Agent, or Firm* — Sughrue Mion, PLLC

(57) ABSTRACT

A transcoder device includes means for receiving encoding information transmitted from a motion-picture encoding and transmitting device and decoding information transmitted from a motion-picture receiving and decoding device, referring to the encoding information and the decoding information to determine whether the syntax in a video packet transmitted from the motion-picture encoding and transmitting device is transcoded, and outputting transcoding control information, and means for transcoding an encoded bitstream that is input in the syntax level on the basis of the transcoding control information and transmitting the transcoded encoded bitstream to the motion-picture receiving and decoding device.

9 Claims, 9 Drawing Sheets

TRANSCODER DEVICE FOR TRANSCODING COMPRESSED AND ENCODED BITSTREAM OF MOTION PICTURE IN SYNTAX LEVEL AND MOTION PICTURE COMMUNICATION SYSTEM

This application claims priority to prior Japanese patent application JP 2005-14551, the disclosure of which is incorporated herein by reference.

BACKGROUND OF THE INVENTION

The present invention relates to a transcoder device using a compression encoding format for a motion picture and, more particularly, to a transcoder device for transcoding a compressed and encoded bitstream of the motion picture in a syntax level. Furthermore, the present invention relates to a motion picture communication system including the transcoder device.

In recent years, for example, International Telecommunication Union Telecommunication Standardization sector (ITU-TS) recommendations H.261 and H.263, and Moving Picture Experts Group (MPEG)-4 internationally standardized by International Organization for Standardization (ISO)/International Electrotechnical Commission (IEC) are known as compression encoding formats for efficiently transmitting motion picture signals within narrower bandwidths.

The compression encoding formats for motion pictures, such as H.261, H.263, and MPEG-4, adopt hybrid compression in which reduction in the redundancy in a time-base direction by the use of motion-compensated interframe prediction is combined with reduction in the redundancy in a spatial direction by the use of discrete cosine transform (DCT) and variable length coding (VLC) using Huffman codes.

However, different bitstreams are generated in the compression and encoding in different compression encoding formats for motion pictures.

Accordingly, when a motion-picture encoding device uses a compression encoding format different from that in a motion-picture decoding device, it is necessary to provide a transcoder device that transcodes an encoded bitstream transmitted from the motion-picture encoding device into an encoded bitstream that can be correctly decoded by the motion-picture decoding device, in order to realize video communication between the motion-picture encoding device and the motion-picture decoding device.

FIG. 1 is a block diagram showing a typical structure of a transcoder device 7 in which a decoding unit 71 is tandem-connected to an encoding unit 72. The decoding unit 71 decodes an encoded bitstream transmitted from a motion-picture encoding device. The encoding unit 72 outputs an encoded bitstream that can be correctly decoded by a motion-picture decoding device. The encoded bitstream that is received from the motion-picture encoding device is input in the decoding unit 71 that decodes the received encoded bitstream into a motion picture signal. The decoded motion picture signal is supplied to the encoding unit 72 that is required to generate an encoded bitstream again.

The decoding unit 71 includes a reception buffer 701, a variable-length decoder 702, an inverse quantizer 703, an inverse discrete cosine transformer 704, an adder 707, a frame memory 705, and a motion compensation predictor 706.

The reception buffer 701 temporarily stores motion-picture encoded data 718 that is received. The variable-length decoder 702 decodes the motion-picture encoded data. The inverse quantizer 703 inversely quantizes the decoded data. The inverse discrete cosine transformer 704 performs inverse discrete cosine transform (inverse DCT) for the output from the inverse quantizer 703. The frame memory 705 stores a motion picture signal 719. The motion compensation predictor 706 detects a motion vector on the basis of the decoded data and the motion picture signal 719 and performs motion compensation prediction. The decoding unit 71 outputs the decoded motion picture signal 719.

The encoding unit 72 includes a subtractor 708, a discrete cosine transformer 709, a quantizer 710, a variable length encoder 711, a transmission buffer 712, an inverse quantizer 713, an inverse discrete cosine transformer 714, an adder 715, a frame memory 716, and a motion compensation predictor 717.

The subtractor 708 subtracts an output from the motion compensation predictor 717 from the received motion picture signal 719. The discrete cosine transformer 709 performs the DCT for the output from the subtractor 708. The quantizer 710 quantizes the output from the discrete cosine transformer 709. The variable length encoder 711 encodes the output from the quantizer 710. The transmission buffer 712 temporarily stores the encoded data supplied from the variable length encoder 711. The inverse quantizer 713 inversely quantizes the output from the quantizer 710. The inverse discrete cosine transformer 714 performs the inverse DCT for the output from the inverse quantizer 713. Since the structure of the decoding unit 71 and the encoding unit 72 shown in FIG. 1 is well known, a detailed description of the components in the decoding unit 71 and the encoding unit 72 is omitted herein.

Even when the motion-picture encoding device uses the same compression encoding format as in the motion-picture decoding device, encoding tools including a resynchronization marker (RM), data partitioning (DP), and reversible variable length coding (RVLC) are defined in the MPEG-4 in order to prevent the quality of the motion picture after the decoding from largely degrading if, for example, a bit error occurs in the encoded bitstream.

The use of the encoding tools is not essential and it is possible for a user to arbitrarily determine whether the above encoding tools are used. However, different syntaxes are defined for the encoded bitstreams in the MPEG-4 depending on the used encoding tools.

As described above, even when the motion-picture encoding device uses the same compression encoding format as in the motion-picture decoding device, the user can arbitrarily determine whether, for example, the encoding tools are used. In addition, parameter values used in the encoding can be arbitrarily set. Different syntaxes are used for the encoded bitstream depending on the arbitrary determination or the arbitrary setting.

Hence, even when the motion-picture encoding device uses the same compression encoding format as in the motion-picture decoding device, the transcoder device described above is required to realize the video communication between the motion-picture encoding device and the motion-picture decoding device.

In the transcoder device described above, the decoding unit for decoding an encoded bitstream transmitted from the motion-picture encoding device is connected to the encoding unit for outputting an encoded bitstream that can be correctly decoded by the motion-picture decoding device. Since the received encoded bitstream is input in the decoding unit that decodes the encoded bitstream into a motion picture signal and the decoded motion picture signal is input in the encoding unit that generates an encoded bitstream again, an extremely large amount of calculation is required. The extremely large amount of calculation causes increase in the circuit size and the power consumption.

Furthermore, when the motion-picture encoding device uses the same compression encoding format as in the motion-picture decoding device and the above transcoder device is not provided, there is a problem in that the encoded bitstream output from the motion-picture encoding device cannot be correctly decoded by the motion-picture decoding device depending on whether the encoding tools are used or how the parameter values used in the encoding are set.

SUMMARY OF THE INVENTION

In order to overcome the above-described problems, an object of the present invention is to provide a device capable of suppressing the amount of calculation by transcoding an encoded bitstream in a syntax level, without inputting the encoded bitstream in a decoding unit that decodes the encoded bitstream into a motion picture signal and inputting the decoded motion picture signal in an encoding unit that generates an encoded bitstream again, even when a motion-picture encoding device uses the same compression encoding format as in a motion-picture decoding device but uses encoding tools different from those of the motion-picture decoding device.

It is another object of the present invention to provide a transcoder device that allows the motion-picture decoding device to correctly decode the encoded bitstream output from the motion-picture encoding device, regardless of use of the encoding tools or arbitrary conversion of parameter values used in the encoding, when the motion-picture encoding device uses the same compression encoding format as in the motion-picture decoding device.

The present invention has the following structures in order to achieve the above objects.

One aspect of the present invention provides a transcoder device which includes means for receiving encoding information transmitted from a motion-picture encoding and transmitting device and decoding information transmitted from a motion-picture receiving and decoding device, referring to the encoding information and the decoding information to determine whether the syntax in a video packet transmitted from the motion-picture encoding and transmitting device is transcoded, and outputting transcoding control information, and which includes means for transcoding an encoded bitstream that is input in a syntax level on the basis of the transcoding control information and transmitting the transcoded encoded bitstream to the motion-picture receiving and decoding device.

Another aspect of the present invention provides a transcoder device which includes a variable length decoder, a parameter order changer, a variable length encoder, and a transcoding controller. The variable length decoder receives a video packet that is input, uses a variable length code table to perform variable length decoding for parameters other than AC components in the video packet, and uses the variable length code table when reversible variable length coding is not used or uses a reversible variable length code table when the reversible variable length coding is used to perform the variable length decoding for the AC components. The parameter order changer rearranges bit strings on the basis of the result of the variable length decoding in the variable length decoder. The variable length encoder uses the variable length code table when the reversible variable length coding is not used or uses the reversible variable length code table when the reversible variable length coding is used to perform variable length coding only for the AC components. The transcoding controller refers to encoding information transmitted from a motion-picture encoding and transmitting device and decoding information transmitted from a motion-picture receiving and decoding device to determine whether the syntax in the input video packet is transcoded and outputs transcoding control information.

The transcoder device preferably includes a reception buffer that receives an encoded bitstream transmitted from the motion-picture encoding and transmitting device, a first switch, a second switch, and a transmission buffer. The first switch receives the output from the reception buffer and switches the output to either the variable length encoder or the second switch, the second switch receives the outputs from the variable length encoder and the first switch and switches the outputs, and the transmission buffer receives the output from the second switch. The transcoding controller preferably refers to the encoding information transmitted from the motion-picture encoding and transmitting device and the decoding information transmitted from the motion-picture receiving and decoding device to distinguish a difference between input encoding tools used in the input encoded bitstream and output encoding tools used in an output encoded bitstream output from the transmission buffer. If all the input encoding tools are identical to the output encoding tools, the transcoding controller preferably supplies the video packet supplied from the reception buffer to the transmission buffer through the first and second switches without transcoding the syntax in the video packet. If the input encoding tools includes at least one encoding tool different from the output encoding tools, the transcoding controller preferably refers to the encoding information transmitted from the motion-picture encoding and transmitting device to acquire the input encoding tools and outputs information concerning the acquired input encoding tools as the transcoding control information.

Still another aspect of the present invention provides a transcoder device which includes a reception buffer, a first switch, a header determiner, a parameter value converter, a bit position shifter-byte aligner, a second switch, a transmission buffer, and a transcoding controller. The reception buffer receives an encoded bitstream transmitted from a motion-picture encoding and transmitting device. The first switch receives the encoded bitstream output from the reception buffer and switches the output. The header determiner determines whether a video packet supplied from the first switch is the first video packet in a video object plane or whether a header extension code is included in the header of the video packet. The parameter value converter converts a video-object-plane time increment value represented in an input time resolution into a value represented in an output time resolution. The bit position shifter-byte aligner shifts the bit positions of parameters subsequent to the value converted in the parameter value converter and aligns the last byte of the video packet. The second switch receives the outputs from the bit position shifter-byte aligner and the first switch and switches the outputs. The transmission buffer receives the output from the second switch. The transcoding controller refers to encoding information transmitted from the motion-picture encoding and transmitting device and decoding information transmitted from a motion-picture receiving and decoding device to determine whether the syntax in the video packet output from the reception buffer is transcoded and supplies transcoding control information to the first and second switches, the header determiner, the parameter value converter, and the bit position shifter-byte aligner on the basis of the result of the determination.

According to the embodiments of the present invention, it is possible to suppress the amount of calculation in the transcoder device even when the motion-picture encoding device uses the same compression encoding format as in the motion-picture decoding device but uses the encoding tools different from those of the motion-picture decoding device.

This is because the encoded bitstream is transcoded in the syntax level, without inputting the encoded bitstream in the decoder that decodes the encoded bitstream into the motion picture signal and inputting the decoded motion picture signal in the encoder that generates an encoded bitstream again.

According to the embodiments of the present invention, it is also possible to allow the motion-picture decoding device to correctly decode an encoded bitstream transmitted from the motion-picture encoding device, regardless of use of the encoding tools or arbitrary conversion of parameter values used in the encoding, when the motion-picture encoding device uses the same compression encoding format as in the motion-picture decoding device.

This is because the encoding parameters used in the encoded bitstream transmitted from the motion-picture encoding device are transcoded to the encoding parameters that can be correctly decoded by the motion-picture decoding device by referring to the encoding information received from the motion-picture encoding device and the decoding information received from the motion-picture decoding device.

DESCRIPTION OF THE PREFERRED EMBODIMENTS

Figure 1:
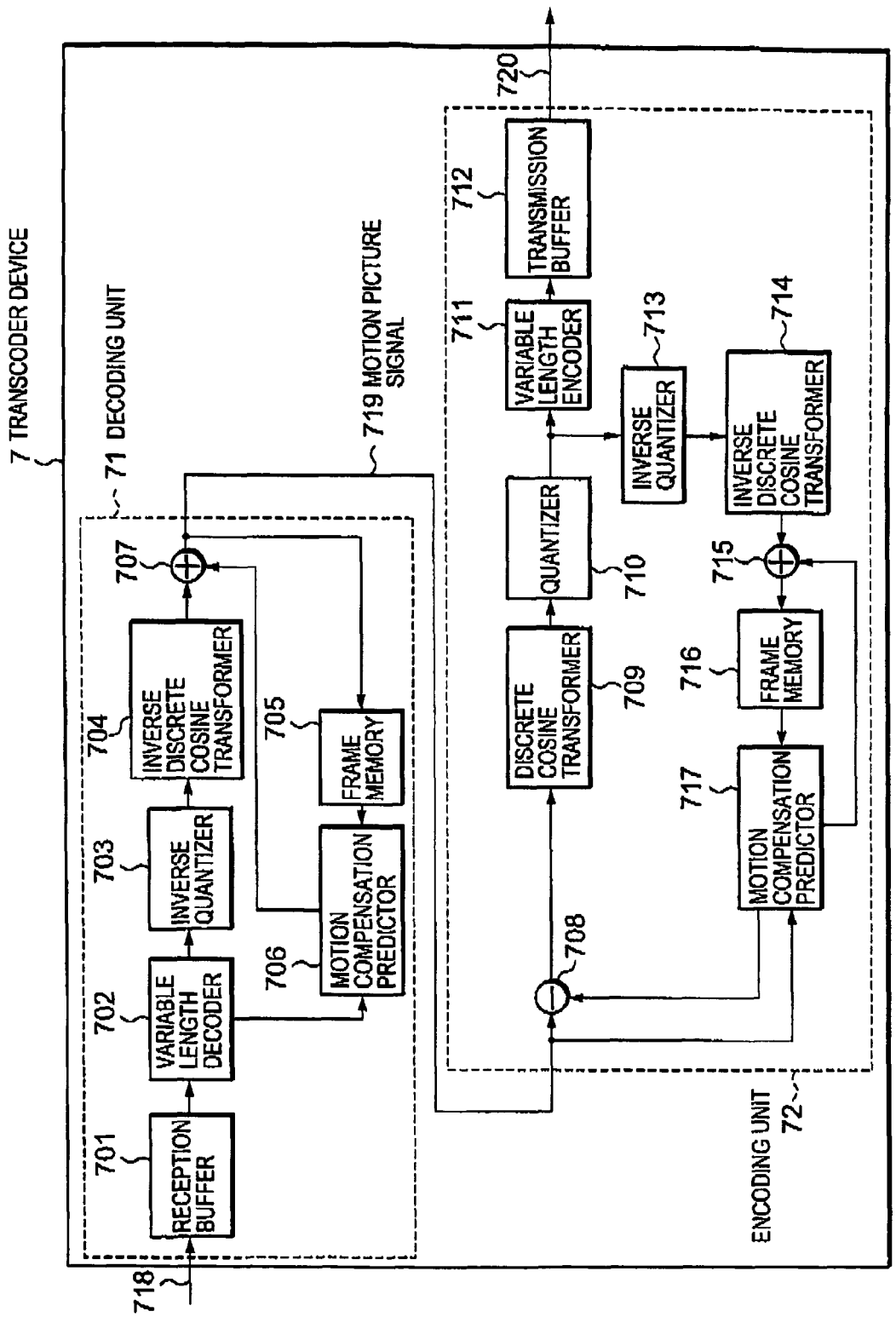
FIG. 1 is a block diagram showing a typical structure of a transcoder device in a related art.

A transcoder device for transcoding a compressed and encoded bitstream of a motion picture in a syntax level, according to an embodiment of the present invention, includes a variable length decoder (reference numeral 203 in FIG. 7) that uses a variable length code table to perform variable length decoding for parameters other than AC components in a video packet that is input, and uses the variable length code table when reversible variable length coding is not used or uses a reversible variable length code table when the reversible variable length coding is used to perform the variable length decoding for the AC components; a parameter order changer (reference numeral 204 in FIG. 7) that rearranges bit strings on the basis of the result of the variable length decoding in the variable length decoder; a variable length encoder (reference numeral 205 in FIG. 7) that uses the variable length code table when the reversible variable length coding is not used or uses the reversible variable length code table when the reversible variable length coding is used to perform variable length coding only for the AC components; and a transcoding controller (reference numeral 208 in FIG. 7) that refers to encoding information transmitted from a motion-picture encoding and transmitting device and decoding information transmitted from a motion-picture receiving and decoding device to determine whether the syntax in the input video packet is transcoded and outputs transcoding control information.

Figure 2:
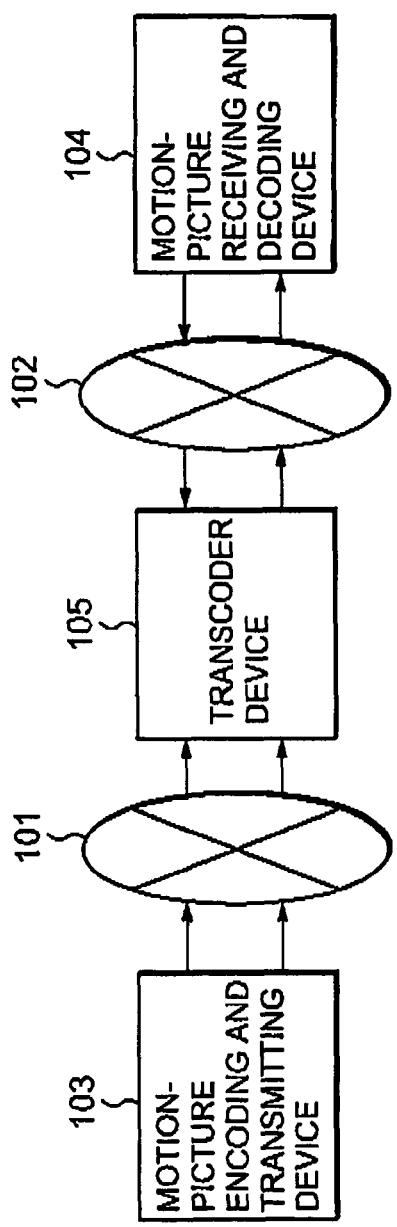
FIG. 2 shows a motion-picture communication system according to embodiments of the present invention.

A first embodiment of the present invention will be described in detail with reference to the attached drawings. FIG. 2 shows a motion-picture communication system according to the embodiments of the present invention. The motion-picture communication system includes a motion-picture encoding and transmitting device 103, a communication path 101, a transcoder device 105, a communication path 102, and a motion-picture receiving and decoding device 104.

The communication path 101 is used for transmitting an encoded bitstream transmitted from the motion-picture encoding and transmitting device 103 to the transcoder device 105. The communication path 101 is also used for transmitting encoding information transmitted from the motion-picture encoding and transmitting device 103 to the transcoder device 105.

The communication path 102 is used for transmitting the encoded bitstream transmitted from the transcoder device 105 to the motion-picture receiving and decoding device 104. The communication path 102 is also used for transmitting decoding information transmitted from the motion-picture receiving and decoding device 104 to the transcoder device 105.

The motion-picture encoding and transmitting device 103 receives a motion picture signal, performs compression and encoding in a compression encoding format such as the MPEG-4, and transmits the encoded bitstream through the communication path 101. The motion-picture encoding and transmitting device 103 also transmits the encoding information through the communication path 101 in order to provide information concerning parameters that are set for generating the encoded bitstream and that are used in an encoder in the transcoder device 105 to the transcoder device 105.

The motion-picture receiving and decoding device 104 decodes the encoded bitstream received through the communication path 102. The motion-picture receiving and decoding device 104 also transmits the decoding information through the communication path 102 in order to provide information concerning parameters that are set for decoding the received encoded bitstream and that are used in a decoder in the transcoder device 105 to the transcoder device 105.

The transcoder device 105 refers to the encoding information received through the communication path 101 and the decoding information received through the communication path 102 to transcode the encoded bitstream received through the communication path 101 into an encoded bitstream that can be decoded by the motion-picture receiving and decoding device 104, and transmits the transcoded encoded bitstream through the communication path 102.

The operation of the motion-picture communication system according to the first embodiment of the present invention will be described in detail with reference to FIGS. 2 to 8. Although the MPEG-4 is exemplified in the following description, the compression encoding format is not limited to the MPEG-4. That is, another compression encoding format may be used, as apparent from the principle of the present invention.

Figure 3:
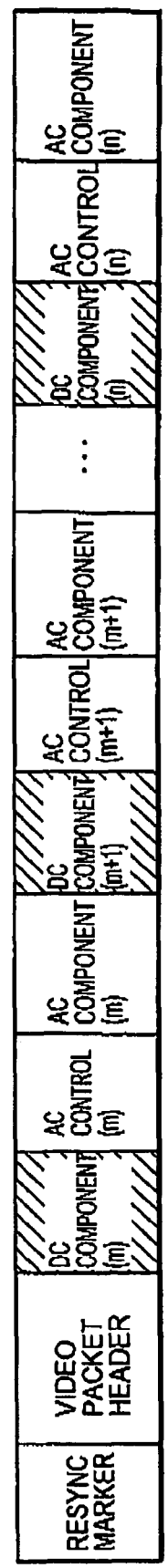
FIG. 3 shows a structure pattern of a video packet in an I-VOP when only a resynchronization marker is used in MPEG-4 according to the embodiments of the present invention.

FIG. 3 shows a structure pattern of a video packet in an intra video object plane (I-VOP) when only the resynchronization marker is used as the encoding tool. It is assumed that the video packet in FIG. 3 includes macroblocks (MBs) from the m-th macroblock to the n-th macroblock. A direct current (DC) component (m) indicates a bit string of information (an encoding mode, a quantization difference, and a DC component) required for decoding the DC component in the m-th MB.

An alternate current (AC) control (m) indicates a bit string of information (an encoding pattern and an AC prediction flag) required for decoding the AC component in the m-th MB.

An AC component (m) indicates a bit string of the AC component in the m-th MB.

Figure 4:
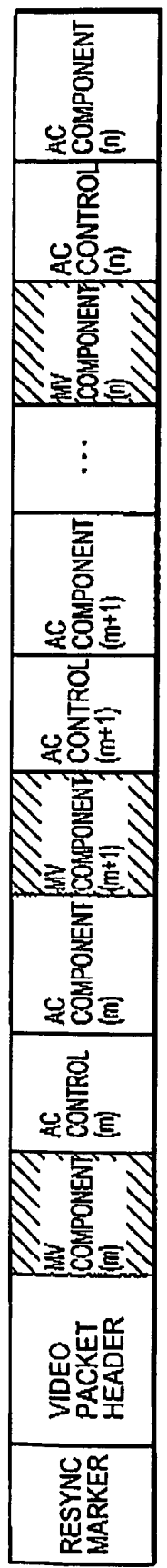
FIG. 4 shows a structure pattern of a video packet in a P-VOP when only the resynchronization marker is used in the MPEG-4 according to the embodiments of the present invention.

FIG. 4 shows a structure pattern of a video packet in an inter prediction video object plane (P-VOP) when only the resynchronization marker is used as the encoding tool.

A motion vector (MV) component (m) indicates a bit string of information (an encoding MB flag, an encoding mode, and a motion vector) required for decoding a motion vector.

An AC control (m) indicates a bit string of information (an encoding pattern, an AC prediction flag, and a quantization difference) required for decoding the AC component.

An AC component (m) indicates a bit string of the AC component.

Figure 5:
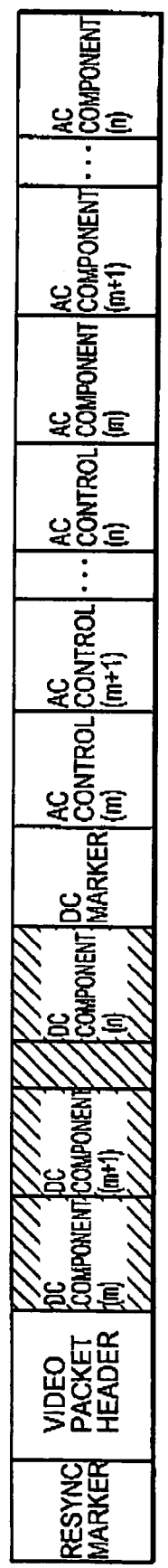
FIG. 5 shows a structure pattern of a video packet in the I-VOP when data partitioning is used, in addition to the resynchronization marker, in the MPEG-4 according to the embodiments of the present invention.

FIG. 5 shows a structure pattern of a video packet in the I-VOP when the data partitioning is used, in addition to the resynchronization marker, as the encoding tools.

The DC components, the AC controls, and the AC components have the same meanings as in FIG. 3. Each MB has the same data (bit string) as in FIG. 3. However, the bit strings are arranged in units of MB in FIG. 3 whereas the bit strings are arranged in descending order of importance of the data in FIG. 5.

A DC marker is added between the DC components and the AC controls.

In addition, when the reversible VLC is also used, the AC components are encoded by the use of a reversible variable length code table (RVLC table), instead of a normal variable length code table (VLC table).

Figure 6:
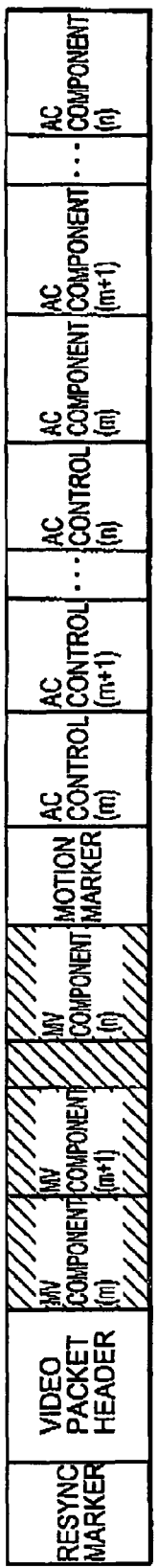
FIG. 6 shows a structure pattern of a video packet in the P-VOP when the data partitioning is used, in addition to the resynchronization marker, in the MPEG-4 according to the embodiments of the present invention.

FIG. 6 shows a structure pattern of a video packet in the P-VOP when the data partitioning is used, in addition to the resynchronization marker, as the encoding tools. The MV components, the AC controls, and the AC components have the same meanings as in FIG. 4.

Each MB has the same data (bit string) as in FIG. 4. However, the bit strings are arranged in units of MB in FIG. 4 whereas the bit strings are arranged in descending order of importance of the data in FIG. 6.

A motion marker is added between the MV components and the AC controls. In addition, when the reversible VLC is also used, the AC components are encoded by the use of the RVLC table, instead of the normal VLC table.

Figure 7:
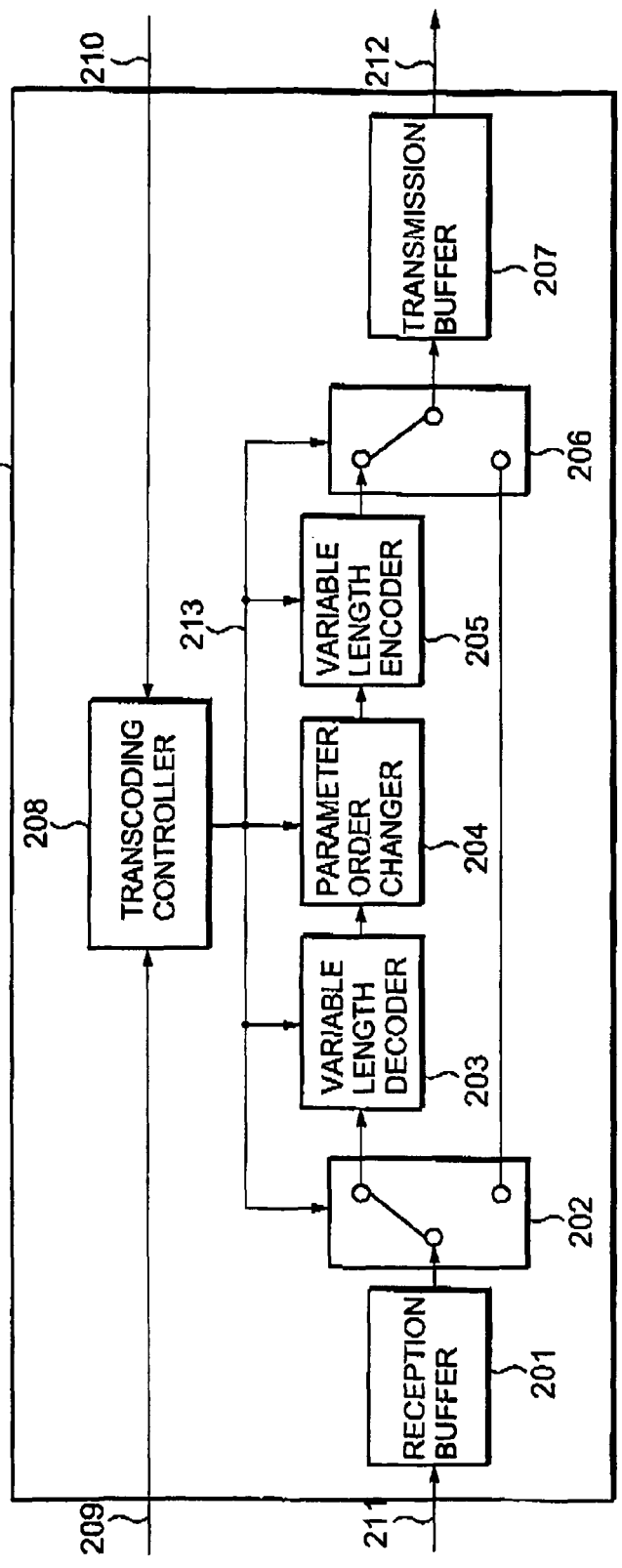
FIG. 7 is a block diagram showing an example of the structure of a transcoder device for transcoding a compressed and encoded bitstream of a motion picture in a syntax level, according to a first embodiment of the present invention.

FIG. 7 is a block diagram showing an example of the structure of a transcoder device 2 according to the first embodiment of the present invention. Referring to FIG. 7, a reception buffer 201 temporarily stores an encoded bitstream 211 transmitted from the motion-picture encoding and transmitting device 103.

The reception buffer 201 acquires a video packet shown in FIG. 3, 4, 5, or 6 and supplies the acquired video packet to a transcoding switch 202. The transcoding switch 202 has a function of switching between a mode in which the syntax in the video packet supplied from the reception buffer 201 is transcoded and a mode in which the syntax in the video packet is not transcoded, in accordance with transcoding control information 213 provided by a transcoding controller 208.

If the syntax in the video packet supplied from the reception buffer 201 is to be transcoded, the video packet supplied from the reception buffer 201 is supplied to a variable length decoder 203.

If the syntax in the video packet supplied from the reception buffer 201 is not to be transcoded, the video packet supplied from the reception buffer 201 is supplied to a transcoding switch 206.

The variable length decoder 203 uses the normal VLC table to perform variable length decoding for the parameters other than the AC components in the video packet supplied from the transcoding switch 202.

The variable length decoder 203 has a function of controlling the variable length decoding in accordance with the transcoding control information 213 provided by the transcoding controller 208.

The variable length decoder 203 uses the normal VLC table when the reversible VLC is not used to perform the variable length decoding for the AC components, and uses the RVLC table when the reversible VLC is used to perform the variable length decoding for the AC components.

A parameter order changer 204 rearranges the bit strings on the basis of the result of the variable length decoding for the video packet supplied from the transcoding switch 202, performed in the variable length decoder 203.

The parameter order changer 204 has a function of controlling the rearrangement of the bit strings in accordance with the transcoding control information 213 provided by the transcoding controller 208.

If the video packet supplied from the transcoding switch 202 has the structure pattern in FIG. 3, the structure pattern is changed to the structure pattern in FIG. 5 and the DC marker is added.

If the video packet supplied from the transcoding switch 202 has the structure pattern in FIG. 4, the structure pattern is changed to the structure pattern in FIG. 6 and the motion marker is added.

If the video packet supplied from the transcoding switch 202 has the structure pattern in FIG. 5, the structure pattern is changed to the structure pattern in FIG. 3 and the DC marker is deleted.

If the video packet supplied from the transcoding switch 202 has the structure pattern in FIG. 6, the structure pattern is changed to the structure pattern in FIG. 4 and the motion marker is deleted.

A variable length encoder 205 performs variable length coding only for the AC components.

The variable length encoder 205 has a function of controlling the variable length coding in accordance with the transcoding control information 213 provided by the transcoding controller 208.

The variable length encoder 205 uses the normal VLC table when the reversible VLC is not used to perform the variable length coding, and uses the RVLC table when the reversible VLC is used to perform the variable length coding.

The transcoding switch 206 has a function of switching between the mode in which the syntax in the video packet supplied from the reception buffer 201 is transcoded and the mode in which the syntax in the video packet is not transcoded, in accordance with the transcoding control information 213 provided by the transcoding controller 208.

If the syntax in the video packet supplied from the reception buffer 201 is to be transcoded, the transcoding switch 206 supplies the video packet supplied from the variable length encoder 205 to a transmission buffer 207.

If the syntax in the video packet supplied from the reception buffer 201 is not to be transcoded, the transcoding switch 206 supplies the video packet supplied from the transcoding switch 202 to the transmission buffer 207.

The transmission buffer 207 temporarily stores the video packet supplied from the transcoding switch 206. The transmission buffer 207 transmits the stored video packet to the motion-picture receiving and decoding device 104 as an encoded bitstream 212.

The transcoding controller 208 refers to encoding information 209 transmitted from the motion-picture encoding and transmitting device 103 and decoding information 210 transmitted from the motion-picture receiving and decoding device 104 to determine whether the syntax in the video packet output from the reception buffer 201 is transcoded.

The transcoding controller 208 supplies the transcoding control information 213 to the transcoding switches 202 and 206, the variable length decoder 203, the parameter order changer 204, and the variable length encoder 205 on the basis of the determination.

Figure 8:
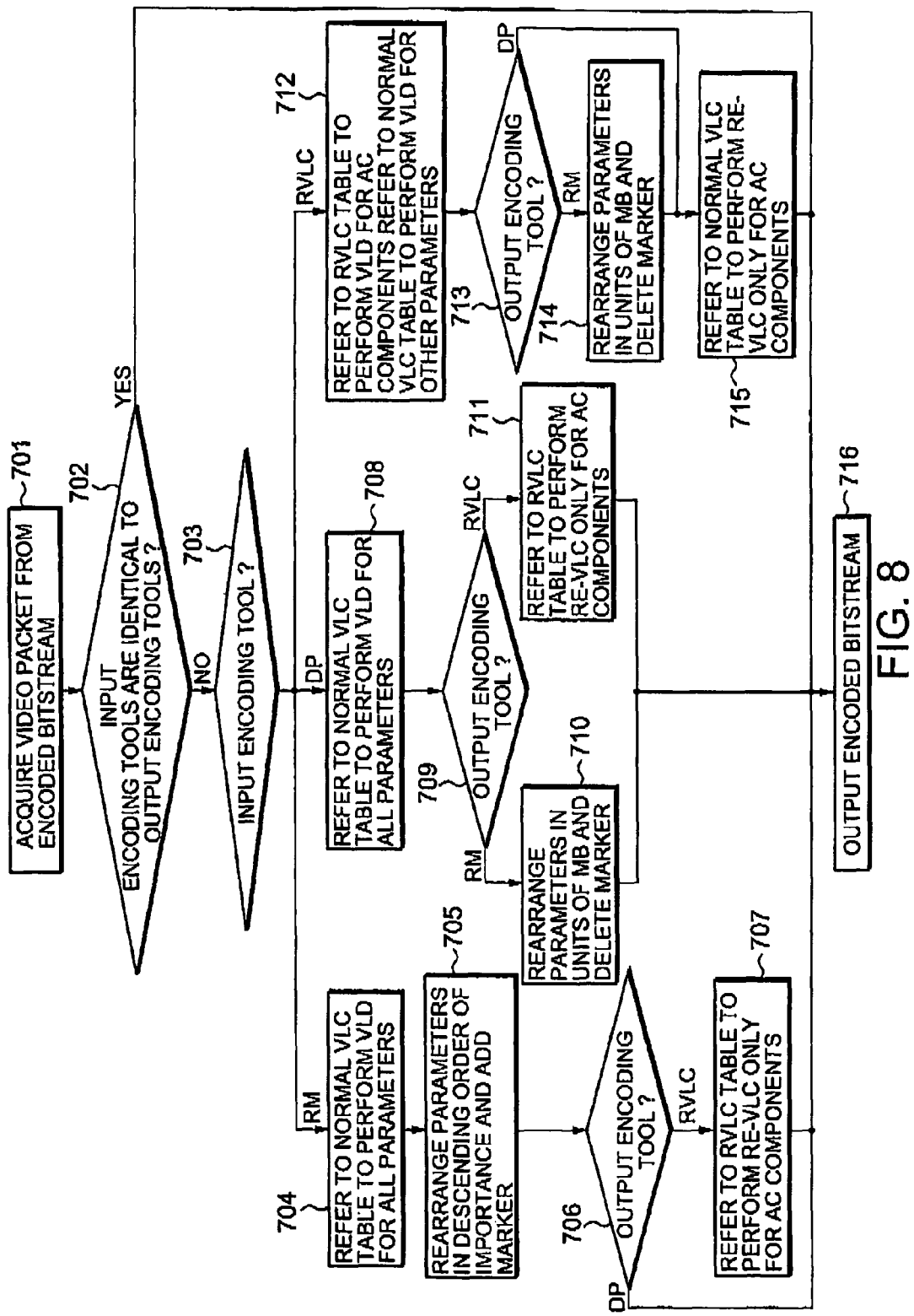
FIG. 8 is a flowchart showing the operation of the transcoder device according to the first embodiment of the present invention.

FIG. 8 is a flowchart showing the operation of the transcoder device 2 according to the first embodiment of the present invention.

In Step 701, the reception buffer 201 receives the encoded bitstream 211 transmitted from the motion-picture encoding and transmitting device 103 and acquires the video packet shown in FIG. 3, 4, 5, or 6.

In Step 702, the transcoding controller 208 refers to the encoding information 209 transmitted from the motion-picture encoding and transmitting device 103 and the decoding information 210 transmitted from the motion-picture receiving and decoding device 104 to determine whether the encoding tools used in the encoded bitstream 211 (referred to as "input encoding tools") are identical to the encoding tools used in the encoded bitstream 212 (referred to as "output encoding tools").

Specifically, the transcoding controller 208 determines whether the resynchronization marker (RM), the data partitioning (DP), and the reversible VLC (RVLC) are used as the input encoding tools and the output encoding tools to distinguish a difference between the input encoding tools and the output encoding tools.

If all the input encoding tools are identical to the output encoding tools, the transcoding controller 208 supplies the transcoding control information 213 to the transmission buffer 207 through the transcoding switches 202 and 206 without transcoding the syntax in the video packet.

If the input encoding tools includes at least one encoding tool different from the output encoding tools, the operation proceeds to Step 703.

In Step 703, the transcoding controller 208 refers to the encoding information 209 transmitted from the motion-picture encoding and transmitting device 103 to acquire the input encoding tools, and outputs information concerning the acquired input encoding tool as the transcoding control information 213.

If only the resynchronization marker is used as the input encoding tool, the operation proceeds to Step 704.

If the resynchronization marker and the data partitioning are used as the input encoding tools, the operation proceeds to Step 708.

If the resynchronization marker, the data partitioning, and the reversible VLC are used as the input encoding tools, the operation proceeds to Step 712.

In Step 704, the variable length decoder 203 refers to the normal VLC table to perform the variable length decoding (VLD) for all the parameters in the video packet supplied from the transcoding switch 202.

In Step 705, the parameter order changer 204 rearranges the parameters in the video packet, which have been arranged in unit of MBs (refer to FIG. 3 or 4), in descending order of importance of the parameters (refer to FIG. 5 or 6) on the basis of the result of the VLD in the variable length decoder 203.

The DC marker is added between the DC components and the AC controls in the rearrangement from FIG. 3 to FIG. 5. The motion marker is added between the MV components and the AC controls in the rearrangement from FIG. 4 to FIG. 6.

In Step 706, the transcoding controller 208 refers to the decoding information 210 transmitted from the motion-picture receiving and decoding device 104 to acquire the output encoding tools.

Information concerning the acquired output encoding tools is output as the transcoding control information 213.

If the resynchronization marker and the data partitioning are used as the output encoding tools, the rearranged video packet is supplied to the transmission buffer 207.

If the resynchronization marker, the data partitioning, and the reversible VLC are used as the input encoding tools, the operation proceeds to Step 707.

In Step 707, the variable length encoder 205 refers to the RVLC table to perform re-VLC only for the AC components in FIG. 5 or 6.

The video packet subjected the re-VLC is supplied to the transcoding switch 206.

In Step 708, the variable length decoder 203 refers to the normal VLC table to perform the VLD for all the parameters in the video packet supplied from the transcoding switch 202.

In Step 709, the transcoding controller 208 refers to the decoding information 210 transmitted from the motion-picture receiving and decoding device 104 to acquire the output encoding tools. Information concerning the acquired output encoding tools is output as the transcoding control information 213, If only the resynchronization marker is used as the output encoding tool, the operation proceeds to Step 710. If the resynchronization marker, the data partitioning, and the reversible VLC are used as output encoding tools, the operation proceeds to Step 711.

In Step 710, the parameter order changer 204 rearranges the parameters in the video packet, which have been arranged in descending order of importance of the parameters (refer to FIG. 5 or 6), in units of MB (refer to FIG. 3 or 4) on the basis of the result of the VLD in the variable length decoder 203. The DC marker between the DC components and the AC controls is deleted in the rearrangement from FIG. 5 to FIG. 3. The motion marker between the MV components and the AC controls is deleted in the rearrangement from FIG. 6 to FIG. 4.

In Step 711, the variable length encoder 205 refers to the RVLC table to perform the re-VLC only for the AC components in FIG. 5 or 6, as in Step 707. The video packet subjected the re-VLC is supplied to the transcoding switch 206.

In Step 712, the variable length decoder 203 refers to the RVLC table to perform the VLD for the AC components in the video packet supplied from the transcoding switch 202. The variable length decoder 203 refers to the normal VLC table to perform the VLD for the parameters other than the AC components.

In Step 713, the transcoding controller 208 refers to the decoding information 210 transmitted from the motion-picture receiving and decoding device 104 to acquire the output encoding tools. Information concerning the acquired output encoding tools is output as the transcoding control information 213.

If only the resynchronization marker is used as the output encoding tool, the operation proceeds to Step 714.

If the resynchronization marker and the data partitioning are used as the output encoding tools, the operation proceeds to Step 715.

In Step 714, the parameter order changer 204 rearranges the parameters in the video packet, which have been arranged in descending order of importance of the parameters (refer to FIG. 5 or 6), in units of MB (refer to FIG. 3 or 4) on the basis of the result of the VLD in the variable length decoder 203, as in Step 710.

The DC marker between the DC components and the AC controls is deleted in the rearrangement from FIG. 5 to FIG. 3.

The motion marker between the MV components and the AC controls is deleted in the rearrangement from FIG. 6 to FIG. 4.

In Step 715, the variable length encoder 205 refers to the normal VLC table to perform the re-VLC only for the AC components in FIG. 3 or 4. The video packet subjected the re-VLC is supplied to the transcoding switch 206.

In Step 716, the transmission buffer 207 concatenates the video packets supplied from the transcoding switch 206 and transmits the concatenated video packets to the motion-picture receiving and decoding device 104 as an encoded bitstream.

Figure 9:
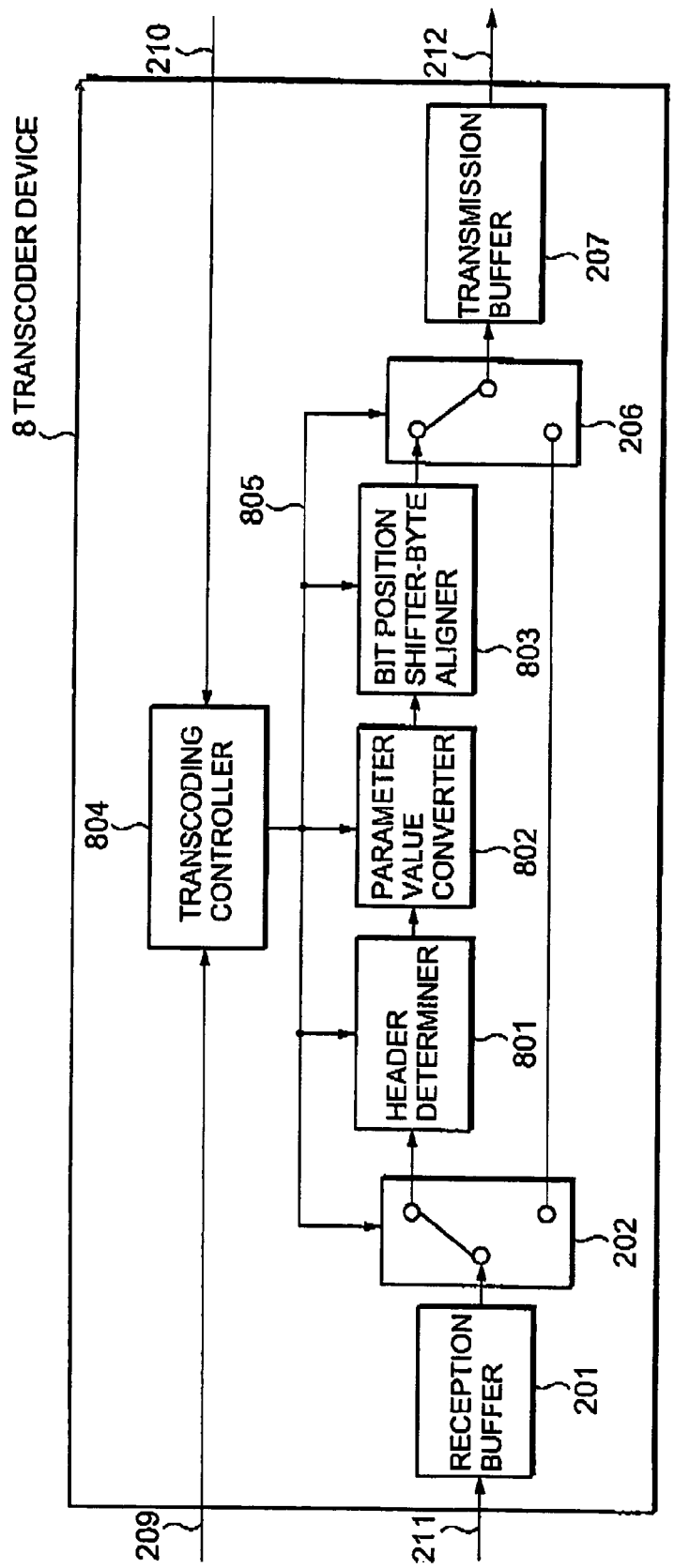
FIG. 9 is a block diagram showing an example of the structure of a transcoder device for transcoding a compressed and encoded bitstream of a motion picture in a syntax level, according to a second embodiment of the present invention.

A second embodiment of the present invention will be described in detail with reference to FIGS. 2, 9, and 10. Since a transcoder device 8 according to the second embodiment of the present invention has a structure and an operation similar to those of the transcoder device 2 according to the first embodiment of the present invention, a description of the components and steps common to those in the first embodiment is omitted herein and only differences are described. FIG. 9 is a block diagram showing an example of the structure of the transcoder device 8 according to the second embodiment of the present invention. Referring to FIG. 9, a header determiner 801 determines whether the video packet supplied from the transcoding switch 202 is the first video packet in the VOP or whether a header extension code (HEC) is included in the header of the video packet.

A parameter value converter 802 converts a VOP time increment value (vop_time_increment) represented in a time resolution (vop_time_increment_resolution) used in the encoded bitstream 211 (hereinafter referred to as an input time resolution) into a value represented in a time resolution used in the encoded bitstream 212 (hereinafter referred to as an output time resolution).

A bit position shifter-byte aligner 803 shifts the bit positions of the parameters subsequent to the value converted in the parameter value converter 802 and aligns the last byte of the video packet.

A transcoding controller 804 refers to the encoding information 209 transmitted from the motion-picture encoding and transmitting device 103 and the decoding information 210 transmitted from the motion-picture receiving and decoding device 104 to determine whether the syntax in the video packet output from the reception buffer 201 is transcoded. The transcoding controller 804 supplies transcoding control information 805 to the transcoding switches 202 and 206, the header determiner 801, the parameter value converter 802, and the bit position shifter-byte aligner 803 on the basis of the result of the determination.

Figure 10:
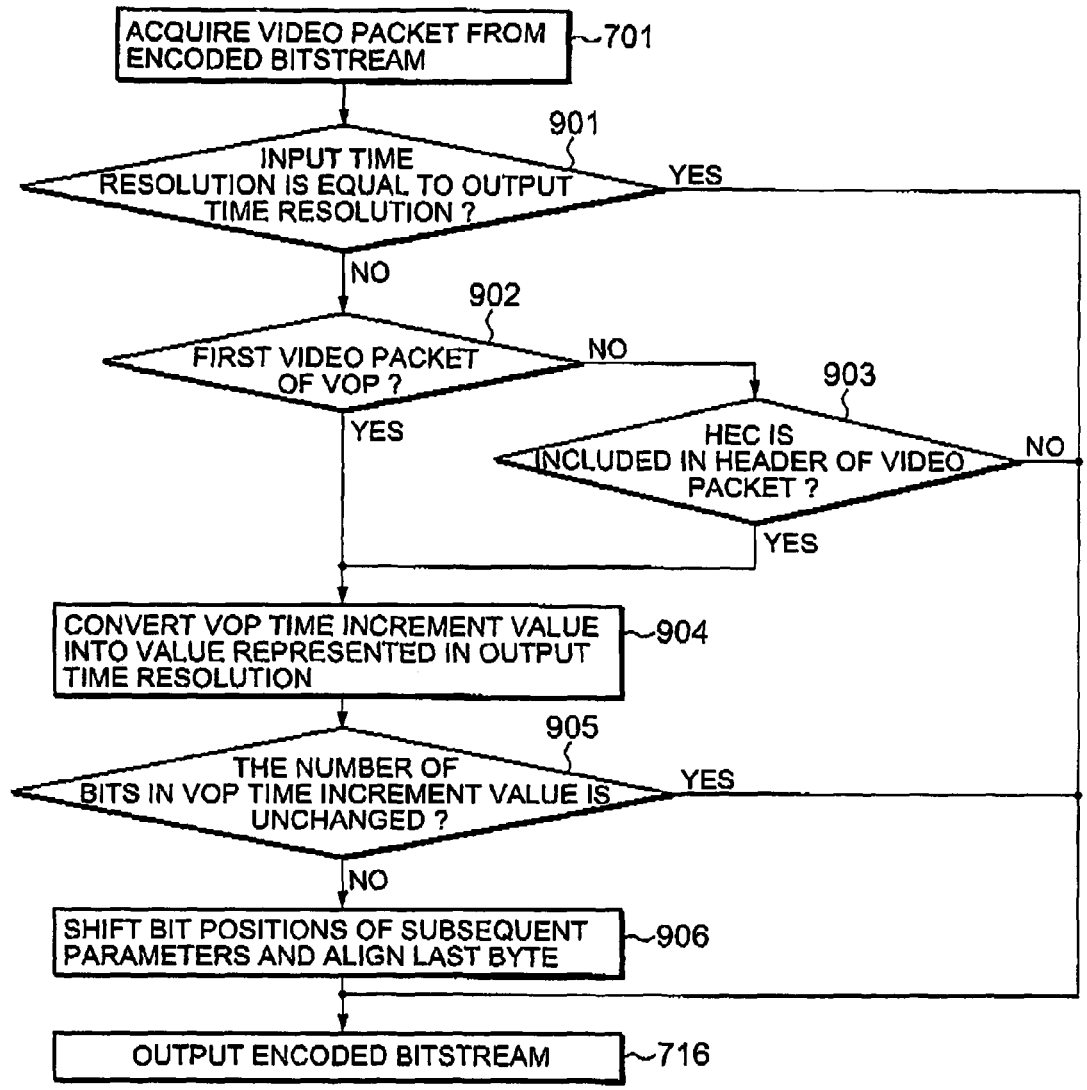
FIG. 10 is a flowchart showing the operation of the transcoder device according to the second embodiment of the present invention.

FIG. 10 is a flowchart showing the operation of the transcoder device 8 according to the second embodiment of the present invention.

In Step 901, the transcoding controller 804 refers to the encoding information 209 transmitted from the motion-picture encoding and transmitting device 103 and the decoding information 210 transmitted from the motion-picture receiving and decoding device 104 to distinguish a difference between the input time resolution (vop_time_increment_resolution) and the output time resolution (vop_time_increment_resolution) used in the encoded bitstream 211 and the encoded bitstream 212, respectively.

If the input time resolution is equal to the output time resolution, the transcoding controller 804 supplies the transcoding control information 805 to the transcoding control information 805 through the transcoding switches 202 and 206 without transcoding the syntax in the video packet.

If the input time resolution is different from the output time resolution, the operation proceeds to Step 902. If the input time resolution is the same as the output time resolution, the operation proceeds to Step 716.

In Step 902, the header determiner 801 determines whether the video packet supplied from the transcoding switch 202 is the first video packet in the VOP. If the video packet is the first video packet, the operation proceeds to Step 904. If the video packet is not the first video packet, the operation proceeds to Step 903.

In Step 903, the header determiner 801 determines whether the HEC is included in the header of the video packet supplied from the transcoding switch 202. If the HEC is included in the header of the video packet, the operation proceeds to Step 904. If the HEC is not included in the header of the video packet, the operation proceeds to Step 716.

In Step 904, the parameter value converter 802 converts the VOP time increment value (vop_time_increment) represented in the input time resolution into a value represented in the output time resolution.

In Step 905, the bit position shifter-byte aligner 803 determines whether the number of bits in the VOP time increment value (vop_time_increment) is changed in Step 904. If the number of bits in the VOP time increment value (vop_time_increment) is changed, the operation proceeds to Step 906.

If the number of bits in the VOP time increment value (vop_time_increment) is not changed, the bit position shifter-byte aligner 803 supplies the video packet supplied from the parameter value converter 802 to the transcoding switch 206 without change.

In Step 906, the bit position shifter-byte aligner 803 shifts the bit positions of the parameters subsequent to the VOP time increment value (vop_time_increment).

In addition, the bit position shifter-byte aligner 803 aligns the last byte of the video packet.

The video packet subjected to the bit position shift and the byte alignment is supplied to the transcoding switch 206.

Figure 11:
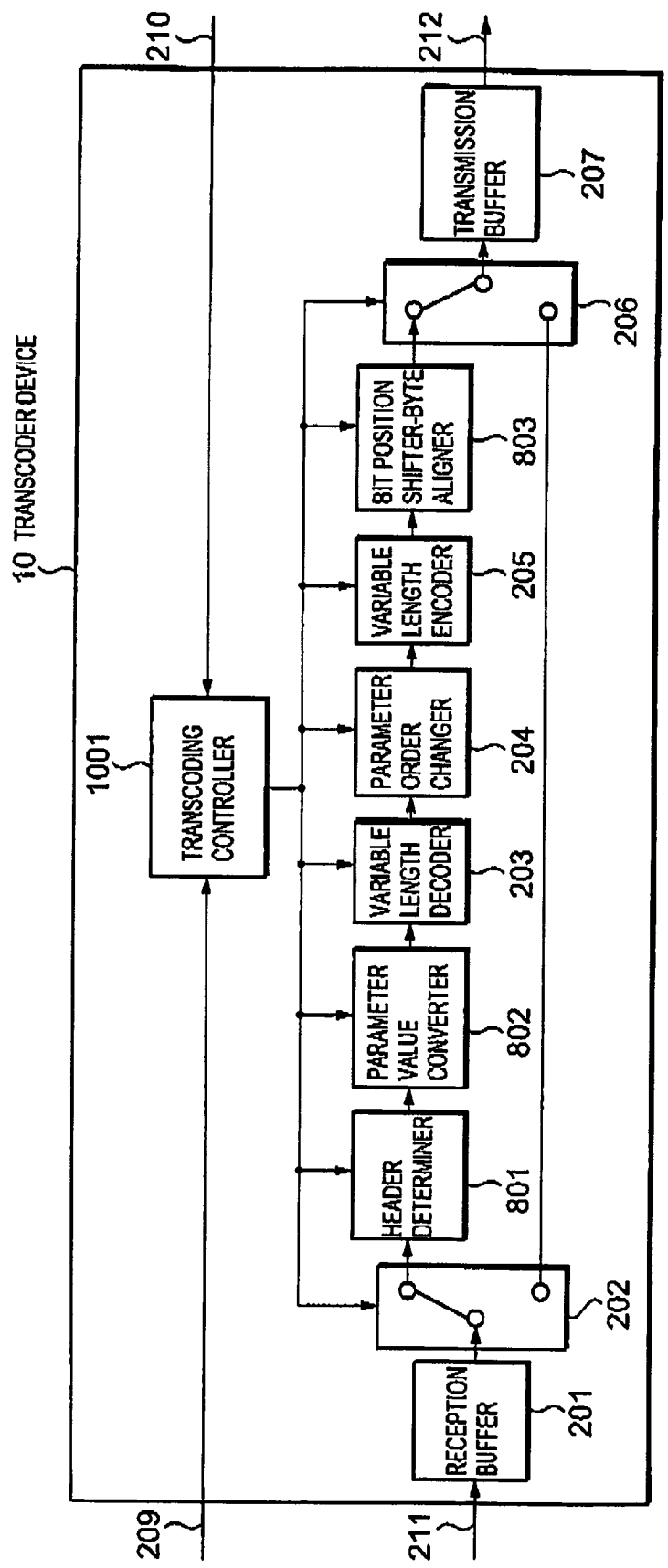
FIG. 11 is a block diagram showing an example of the structure of a transcoder device for transcoding a compressed and encoded bitstream of a motion picture in a syntax level, according to a third embodiment of the present invention.

A third embodiment of the present invention will be described in detail with reference to FIGS. 2, 11, and 12.

Since a transcoder device 10 according to the third embodiment of the present invention has a structure and an operation similar to those of the transcoder device 2 or the transcoder device 8 according to the first or second embodiment of the present invention, a description of the components and steps common to those in the first or second embodiment is omitted herein and only differences are described. FIG. 11 is a block diagram showing an example of the structure of the transcoder device 10 according to the third embodiment of the present invention.

A transcoding controller 1001 refers to the encoding information 209 transmitted from the motion-picture encoding and transmitting device 103 and the decoding information 210 transmitted from the motion-picture receiving and decoding device 104 to determine whether the syntax in the video packet output from the reception buffer 201 is transcoded.

The transcoding controller 1001 supplies transcoding control information 1002 to the transcoding switches 202 and 206, the header determiner 801, the parameter value converter 802, the variable length decoder 203, the parameter order changer 204, the variable length encoder 205, and the bit position shifter-byte aligner 803 on the basis of the result of the determination.

Figure 12:
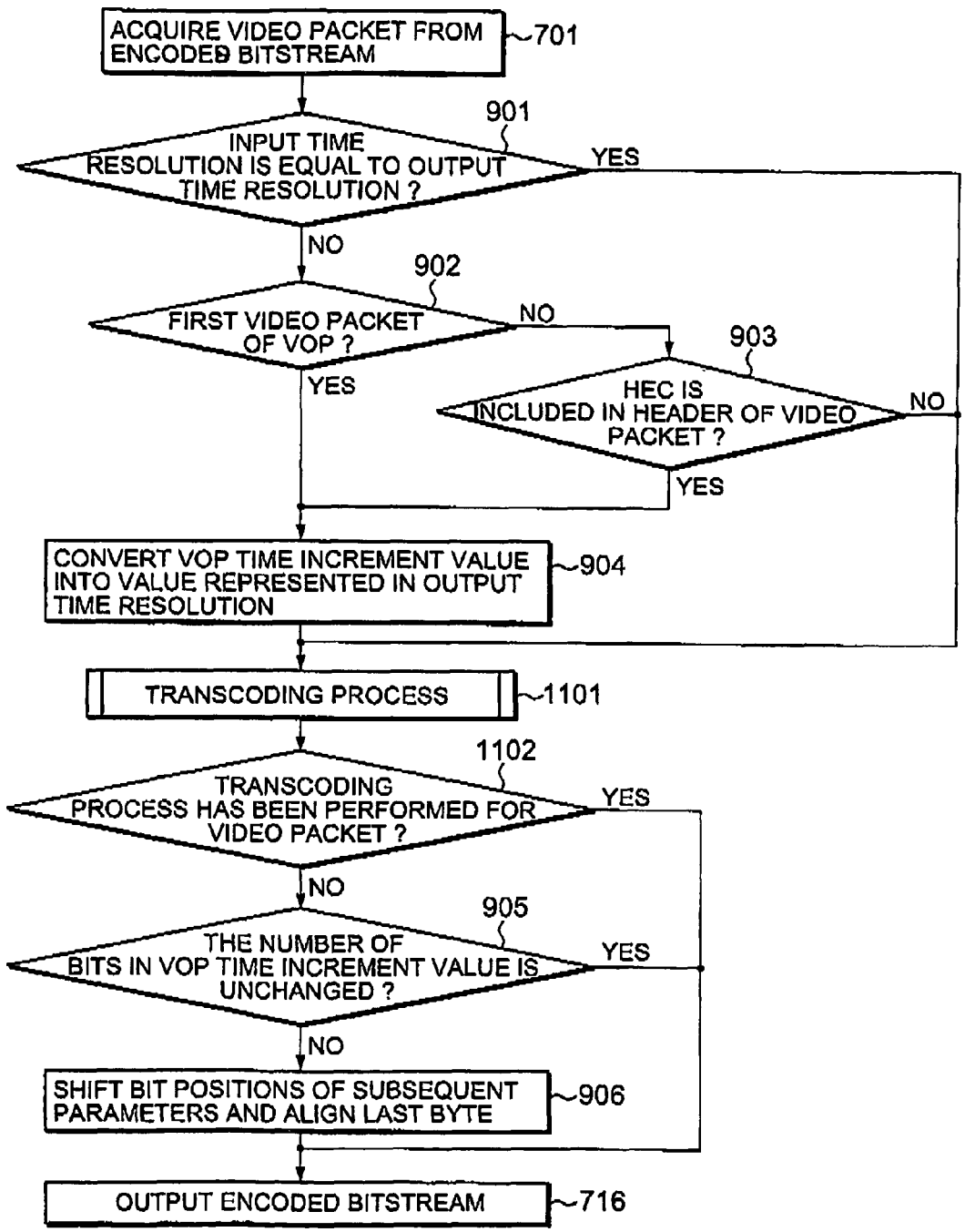
FIG. 12 is a flowchart showing the operation of the transcoder device according to the third embodiment of the present invention.

FIG. 12 is a flowchart showing the operation of the transcoder device 10 according to the third embodiment of the present invention.

In Step 1101, the transcoding process described above with reference to FIG. 8 is performed.

In Step 1102, the bit position shifter-byte aligner 803 determines whether the transcoding process has been performed for the video packet supplied from the variable length encoder 205.

If the transcoding process has been performed for the video packet supplied from the variable length encoder 205, the bit position shifter-byte aligner 803 supplies the video packet supplied from the variable length encoder 205 to the transcoding switch 206 without change.

If the transcoding process has not been performed for the video packet supplied from the variable length encoder 205, the operation proceeds to Step 905. In Step 905, the bit position shifter-byte aligner 803 determines whether the number of bits in the VOP time increment value (vop_time_increment) is changed in Step 904. If the number of bits in the VOP time increment value (vop_time_increment) is changed, the operation proceeds to Step 906. If the number of bits in the VOP time increment value (vop_time_increment) is not changed, the bit position shifter-byte aligner 803 supplies the video packet supplied from the variable length encoder 205 to the transcoding switch 206 without change. In Step 906, the bit position shifter-byte aligner 803 shifts the bit positions of the parameters subsequent to the VOP time increment value (vop_time_increment). In addition, the bit position shifter-byte aligner 803 aligns the last byte of the video packet. The video packet subjected to the bit position shift and the byte alignment is supplied to the transcoding switch 206.

According to the embodiments of the present invention, it is possible to suppress the amount of calculation in the transcoder device even when the motion-picture encoding device uses the same compression encoding format as in the motion-picture decoding device but uses the encoding tools different from those of the motion-picture decoding device.

This is because the encoded bitstream is transcoded in the syntax level, without inputting the encoded bitstream in the decoder that decodes the encoded bitstream into the motion picture signal and inputting the decoded motion picture signal in the encoder that generates an encoded bitstream again.

According to the embodiments of the present invention, it is also possible to allow the motion-picture decoding device to correctly decode an encoded bitstream transmitted from the motion-picture encoding device, regardless of use of the encoding tools or arbitrary conversion of parameter values used in the encoding, when the motion-picture encoding device uses the same compression encoding format as in the motion-picture decoding device.

This is because the encoding parameters used in the encoded bitstream transmitted from the motion-picture encoding device are transcoded to the encoding parameters that can be correctly decoded by the motion-picture decoding device by referring to the encoding information received from the motion-picture encoding device and the decoding information received from the motion-picture decoding device.

What is claimed is:

1. A transcoder device for transcoding a compressed and encoded bitstream of a motion picture in a syntax level, the transcoder device comprising:

means for receiving encoding information transmitted from a motion-picture encoding and transmitting device and decoding information transmitted from a motion-picture receiving and decoding device, referring to the encoding information and the decoding information to determine whether the syntax in a video packet transmitted from the motion-picture encoding and transmitting device is transcoded, and outputting transcoding control information including a difference between input encoding tools used in an input encoded bitstream transmitted from the motion-picture encoding and transmitting device and output encoding tools used in an output encoded bitstream output from a transmission device to the motion-picture receiving and decoding device; and means for transcoding the input encoded bitstream in the syntax level on the basis of the transcoding control information and transmitting the transcoded encoded bitstream as the output encoded bitstream to the motion-picture receiving and decoding device.

2. A transcoder device for transcoding a compressed and encoded bitstream of a motion picture in a syntax level, the transcoder device comprising:

a variable length decoder that receives a video packet that is input, uses a variable length code table to perform variable length decoding for parameters other than AC components in the video packet, and uses the variable length code table when reversible variable length coding is not used or uses a reversible variable length code table when the reversible variable length coding is used to perform the variable length decoding for the AC components;

a parameter order changer that rearranges bit strings on the basis of the result of the variable length decoding in the variable length decoder;

a variable length encoder that uses the variable length code table when the reversible variable length coding is not used or uses the reversible variable length code table when the reversible variable length coding is used to perform variable length coding only for the AC components; and a transcoding controller that refers to encoding information transmitted from a motion-picture encoding and transmitting device and decoding information transmitted from a motion-picture receiving and decoding device to determine whether the syntax in the input video packet is transcoded and outputs transcoding control information including a difference between input encoding tools used in an input encoded bitstream transmitted from the motion-picture encoding and transmitting device and output encoding tools used in an output encoded bitstream output from a transmission device to the motion-picture receiving and decoding device.

3. The transcoder device for transcoding the compressed and encoded bitstream of the motion picture in the syntax level, according to claim 2, the transcoder device further comprising:

a reception buffer that receives the input encoded bitstream transmitted from the motion-picture encoding and transmitting device;
a first switch;
a second switch; and
a transmission buffer,
wherein the first switch receives the output from the reception buffer and switches the output to either the variable length encoder or the second switch, the second switch receives the outputs from the variable length encoder and the first switch and switches the outputs, and the transmission buffer receives the output from the second switch,
wherein the transcoding controller refers to the encoding information transmitted from the motion-picture encoding and transmitting device and the decoding information transmitted from the motion-picture receiving and decoding device to distinguish the difference between the input encoding tools used in the input encoded bitstream and the output encoding tools used in the output encoded bitstream output from the transmission buffer,
wherein, if all the input encoding tools are identical to the output encoding tools, the transcoding controller supplies the video packet supplied from the reception buffer to the transmission buffer through the first and second switches without transcoding the syntax in the video packet, and
wherein, if the input encoding tools includes at least one encoding tool different from the output encoding tools, the transcoding controller refers to the encoding information transmitted from the motion-picture encoding and transmitting device to acquire the input encoding tools and outputs information concerning the acquired input encoding tools as the transcoding control information.

4. The transcoder device for transcoding the compressed and encoded bitstream of the motion picture in the syntax level, according to claim 3, wherein the variable length decoder refers to the variable length code table to perform the variable length decoding for all the parameters in the video packet supplied from the reception buffer through the first switch, if only a resynchronization marker is used as the input encoding tool, wherein the parameter order changer rearranges the parameters in the video packet, which have been arranged in units of macroblocks, in descending order of importance of the parameters on the basis of the result of the variable length decoding in the variable length decoder, wherein the transcoding controller refers to the decoding Information transmitted from the motion-picture receiving and decoding device to acquire the output encoding tools, outputs information concerning the acquired output encoding tools as the transcoding control information, and outputs the rearranged video packet to the transmission buffer if the resynchronization marker and data partitioning are used as the output encoding tools, and wherein, if the resynchronization marker, the data partitioning, and the reversible variable length coding are used as the output encoding tools, the variable length encoder refers to the reversible variable length code table to perform re-variable length coding only for the AC components and supplies the video packet subjected to the re-variable length coding to the second switch.

5. The transcoder device for transcoding the compressed and encoded bitstream of the motion picture in the syntax level, according to claim 3, wherein, if a resynchronization marker and data partitioning are used as the input encoding tools, the variable length decoder refers to the variable length code table to perform the variable length decoding for all the parameters in the video packet supplied from the first switch, wherein the transcoding controller refers to the decoding information transmitted from the motion-picture receiving and decoding device to acquire the output encoding tools and outputs information concerning the acquired output encoding tools as the transcoding control information, wherein, if only the resynchronization marker is used as the output encoding tool, the parameter order changer rearranges the parameters in the video packet, which have been arranged in descending order of Importance of the parameters, in units of macroblocks on the basis of the result of the variable length decoding in the variable length decoder, and wherein, if the resynchronization marker, the data partitioning, and the reversible variable length coding are used as the output encoding tools, the variable length encoder refers to the reversible variable length code table to perform re-variable length coding only for the AC components and supplies the video packet subjected to the re-variable length coding to the second switch.

6. The transcoder device for transcoding the compressed and encoded bitstream of the motion picture In the syntax level, according to claim 3, wherein, If a resynchronization marker, data partitioning, and the reversible variable length coding are used as the input encoding tools, the variable length decoder refers to the reversible variable length code table to perform the variable length decoding for the AC components in the video packet supplied from the first switch and refers to the variable length code table to perform the variable length decoding for the parameters other than the AC components, wherein the transcoding controller refers to the decoding information transmitted from the motion-picture receiving and decoding device to acquire the output encoding tools and outputs information concerning the acquired output encoding tools as the transcoding control information, wherein, if only the resynchronization marker is used as the output encoding tool, the parameter order changer rearranges the parameters in the video packet, which have been arranged in descending order of importance of the parameters, In units of macroblocks on the basis of the result of the variable length decoding in the variable length decoder, and wherein, if the resynchronization marker and the data partitioning are used as the output encoding tools, the variable length encoder refers to the variable length code table to perform re-variable length coding only for the AC components and supplies the video packet subjected to the re-variable length coding to the second switch.

7. The transcoder device for transcoding the compressed and encoded bitstream of the motion picture in the syntax level, according to any of claims 3 to 6, wherein the transmission buffer, concatenates the video packets supplied from the second switch and transmits the concatenated video packets to the motion-picture receiving and decoding device as the output encoded bitstream.

8. A motion-picture communication system comprising: a motion-picture encoding and transmitting device; a first communication path;

a transcoder device for transcoding a compressed and encoded bitstream of a motion picture in a syntax level, connected to the motion-picture encoding and transmitting device via the first communication path; a second communication path; and a motion-picture receiving and decoding device connected to the transcoder device via the second communication path, wherein the transcoder device comprises:

means for receiving encoding information transmitted from the motion-picture encoding and transmitting device and decoding information transmitted from the motion-picture receiving and decoding device, referring to the encoding information and the decoding information to determine whether the syntax in a video packet transmitted from the motion-picture encoding and transmitting device is transcoded, and outputting transcoding control information including a difference between input encoding tools used in an input encoded bitstream transmitted from the motion-picture encoding and transmitting device and output encoding tools used in an output encoded bitstream output from a transmission device to the motion-picture receiving and decoding device; and means for transcoding the input encoded bitstream in the syntax level on the basis of the transcoding control information and transmitting the transcoded encoded bitstream as the output encoded bitstream to the motion-picture receiving and decoding device.

9. A motion-picture communication system comprising:

a motion-picture encoding and transmitting device; a first communication path;

a transcoder device for transcoding a compressed and encoded bitstream of a motion picture in a syntax level, connected to the motion-picture encoding and transmitting device via the first communication path;

a second communication path; and a motion-picture receiving and decoding device connected to the transcoder device via the second communication path, wherein the transcoder device comprises:

a variable length decoder that receives a video packet that is input, uses a variable length code table to perform variable length decoding for parameters other than AC components in the video packet, and uses the variable length code table when reversible variable length coding is not used or uses a reversible variable length code table when the reversible variable length coding is used to perform the variable length decoding for the AC components;

a parameter order changer that rearranges bit strings on the basis of the result of the variable length decoding in the variable length decoder, a variable length encoder that uses the variable length code table when the reversible variable length coding is not used or uses the reversible variable length code table when the reversible variable length coding is used to perform variable length coding only for the AC components; and a transcoding controller that refers to encoding information transmitted from the motion-picture encoding and transmitting device and decoding information transmitted from the motion-picture receiving and decoding device to determine whether the syntax in the input video packet is transcoded and outputs transcoding control information including a difference between input encoding tools used in an input encoded bitstream transmitted from the motion-picture encoding and transmitting device and output encoding tools used in an output encoded bitstream output from a transmission device to the motion-picture receiving and decoding device.

\* \* \* \* \*